(12) United States Patent
Zhang et al.

(10) Patent No.: US 12,596,283 B2
(45) Date of Patent: Apr. 7, 2026

(54) DISPLAY PANEL AND DISPLAY DEVICE

(71) Applicant: Shanghai Tianma Micro-Electronics Co., Ltd., Shanghai (CN)

(72) Inventors: Kaikai Zhang, Shanghai (CN); Yongxin He, Shanghai (CN); Yuan Ding, Shanghai (CN); Jujian Fu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 319 days.

(21) Appl. No.: 18/407,481

(22) Filed: Jan. 9, 2024

(65) Prior Publication Data

US 2024/0142845 A1     May 2, 2024

(30) Foreign Application Priority Data

Oct. 12, 2023   (CN) ......................... 202311322880.X

(51) Int. Cl.
*G02F 1/167*           (2019.01)
*G02F 1/16753*       (2019.01)
*G02F 1/1679*         (2019.01)

(52) U.S. Cl.
CPC .......... *G02F 1/16753* (2019.01); *G02F 1/167* (2013.01); *G02F 1/1679* (2019.01)

(58) Field of Classification Search
CPC .... G02F 1/16753; G02F 1/167; G02F 1/1679; G02F 1/1675
See application file for complete search history.

(56) References Cited

U.S. PATENT DOCUMENTS

| | | | | | |
|---|---|---|---|---|---|
| 10,108,066 | B2 * | 10/2018 | Morrison | ................ | G02F 1/167 |
| 11,886,089 | B2 * | 1/2024 | Trikha | .................... | G02F 1/163 |
| 12,019,347 | B2 * | 6/2024 | Lavrisa | .................... | G02F 1/167 |

FOREIGN PATENT DOCUMENTS

| | | |
|---|---|---|
| CN | 208092391 U | 11/2018 |
| CN | 114859620 A | 8/2022 |
| KR | 20080006036 A | 1/2008 |

* cited by examiner

*Primary Examiner* — Tuyen Tra
(74) *Attorney, Agent, or Firm* — KILPATRICK TOWNSEND & STOCKTON LLP

(57) ABSTRACT

A display panel and a display device are provided. The display panel includes a first substrate, a second substrate arranged opposite to the first substrate, an electrophoresis layer, a liquid-blocking portion and a supporting structure. The electrophoresis layer is arranged between the first substrate and the second substrate and includes multiple electrophoresis particles. The liquid-blocking portion is arranged at an edge of the first substrate and/or the second substrate. The supporting structure is arranged between the first substrate and the second substrate and includes a first supporting portion and a second supporting portion. A height of the first supporting portion is greater than that of the second supporting portion in a direction perpendicular to a plane where the first substrate is located. A minimum distance between the second supporting portion and the liquid-blocking portion is less than that between the first supporting portion and the liquid-blocking portion.

20 Claims, 10 Drawing Sheets

B–B

A–A

DISPLAY PANEL AND DISPLAY DEVICE

CROSS REFERENCE OF RELATED APPLICATION

The present application claims priority to Chinese Patent Application No. 202311322880.X, titled "DISPLAY PANEL AND DISPLAY DEVICE", filed on Oct. 12, 2023 with China National Intellectual Property Administration, which is incorporated herein by reference in its entirety.

FIELD

The present disclosure relates to the field of display devices, in particular to a display panel and a display device.

BACKGROUND

With the development of science and technology, display devices have also evolved, and types of the display devices are becoming increasingly diverse. In conventional technology, the display devices include liquid crystal display devices, organic electroluminescent display devices, and electrophoretic display devices, etc. Among them, the electrophoretic display devices have become increasingly important due to their advantages of low energy consumption, high reflectivity and high contrast.

SUMMARY

Embodiments of the present disclosure provide a display panel and a display device, which improve the applicability of the display panel.

In a first aspect, a display panel is provided according to embodiments of the present disclosure. The display panel includes a first substrate, a second substrate, an electrophoresis layer, a liquid-blocking portion and a supporting structure. The first substrate is arranged opposite to the second substrate. The electrophoresis layer is arranged between the first substrate and the second substrate, and the electrophoresis layer includes multiple electrophoresis particles. The liquid-blocking portion is arranged at an edge of the first substrate and/or the second substrate. The supporting structure is arranged between the first substrate and the second substrate, and the supporting structure includes a first supporting portion and a second supporting portion. A height of the first supporting portion is greater than a height of the second supporting portion in a direction perpendicular to a plane where the first substrate is located. A minimum distance between the second supporting portion and the liquid-blocking part is less than a minimum distance between the first supporting portion and the liquid-blocking portion.

In a second aspect, a display device is provided according to embodiments of the present disclosure. The display device includes a display panel, and the display panel includes a first substrate, a second substrate, an electrophoresis layer, a liquid-blocking portion and a supporting structure. The first substrate is arranged opposite to the second substrate. The electrophoresis layer is arranged between the first substrate and the second substrate, and the electrophoresis layer includes multiple electrophoresis particles. The liquid-blocking portion is arranged at an edge of the first substrate and/or the second substrate. The supporting structure is arranged between the first substrate and the second substrate, and the supporting structure includes a first supporting portion and a second supporting portion. A height of the first supporting portion is greater than a height of the second supporting portion in a direction perpendicular to a plane where the first substrate is located. A minimum distance between the second supporting portion and the liquid-blocking part is less than a minimum distance between the first supporting portion and the liquid-blocking portion.

BRIEF DESCRIPTION OF THE DRAWINGS

The drawings to be used in the embodiments for the present disclosure are described briefly as follows, and according to make the embodiments of the present disclosure become clearer.

Figure 1:
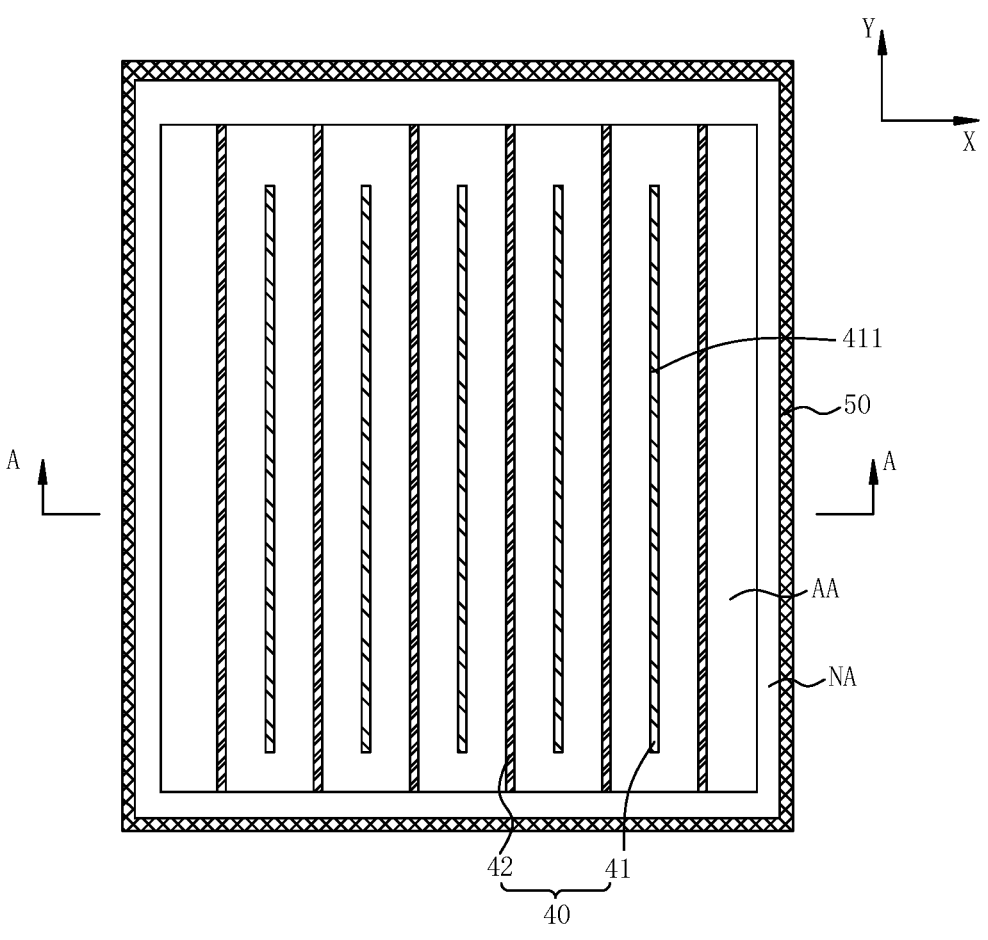
FIG. 1 is a structural schematic diagram of a display panel according to an embodiment of the present disclosure.

Reference numbers:

| | |
|---|---|
| 10. First substrate | 20. Second substrate |
| 30. Electrophoresis layer | 31. Electrophoresis particles |
| 40. Supporting structure | 41. First supporting portion |
| 42. Second supporting portion | 411. First supporting bar |
| 412. Second supporting bar | 41a. First supporting sub-portion |
| 41b. Second supporting sub-portion | 421. Third supporting bar |
| 422. Fourth supporting bar | 50. Liquid-blocking portion |
| 61. First electrode | 62. Second electrode |
| 70. Supporting layer | Z1. First supporting segment |
| Z2. First supporting column | L1. First position |
| T. Flow channel | AA. Display area |
| A1. First area | A2. Second area |
| NA. Non-display area | P. Pixel |
| X. First direction | Y. Second direction |
| M. Third direction | N. Fourth direction |

DETAILED DESCRIPTION

The features and exemplary embodiments of various aspects of the present disclosure are described in detail below. Embodiments of the present disclosure clearer and more apparent, the present disclosure is described in detail in conjunction with the drawings and the embodiments. It should be understood that the embodiments described herein are intended only to interpret the present disclosure and not to limit it. The present disclosure may be implemented without some of these specific details. The following description of the embodiments is only intended to provide a better understanding of the present disclosure by showing examples of the present disclosure.

It should be noted that the relational terms "first", "second" and the like in the description are used for distinguishing an entity or operation from another entity or operation, but not intended to require or imply an actual relationship or order between these entities or operations. Further, the terms "include", "comprise" or any variant thereof are intended to encompass nonexclusive inclusion and a process, method, article or device including a series of elements includes not only those elements but also other elements which have not been listed definitely or an element(s) inherent to the process, method, article or device. Without further limitations, an element defined by the phrase "comprising/including a . . . " does not exclude the presence of additional identical elements in the process, method, article or device including the described elements.

In conventional technology, the electrophoresis display panel is usually provided with an electrophoresis solution and a variety of electrophoresis particles of different colors. The electrophoresis particles can move in the electrophoresis solution, and different colors can be displayed by controlling the distribution of different electrophoresis particles at different positions. However, in conventional technology, the electrophoresis display panel is usually not well supported at a layer structure where the electrophoresis solution is located. This leads to deformation of the electrophoresis display panel during use due to external pressure and other factors, to change the distribution state of the electrophoresis particles in space, and causing discoloring of the electrophoresis display panel when pressed.

Figure 2:
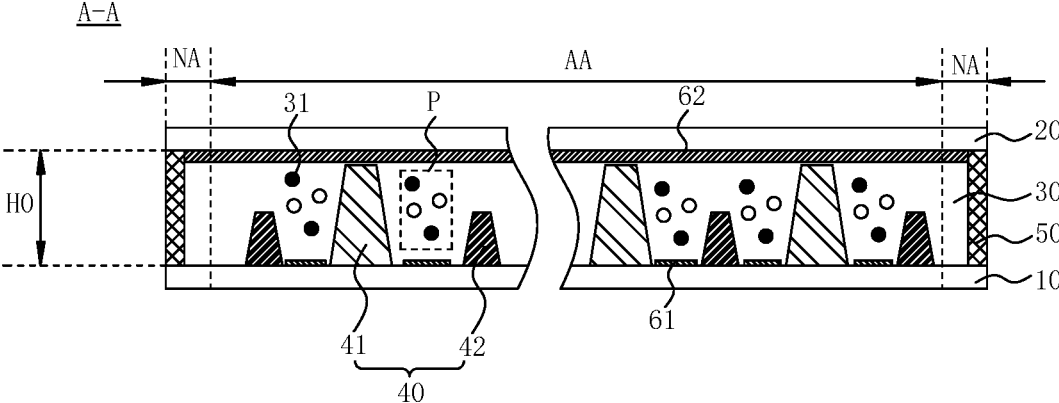
FIG. 2 is a schematic diagram of a cross-sectional structure at position A-A in FIG. 1.

In view of this, in a first aspect, references are made to FIG. 1 and FIG. 2. The embodiment of the present disclosure provides a display panel. The display panel includes a first substrate 10, a second substrate 20, an electrophoresis layer 30, a liquid-blocking portion 50 and a supporting structure 40. The first substrate 10 is arranged opposite to the second substrate 20. The electrophoresis layer 30 is arranged between the first substrate 10 and the second substrate 20. The electrophoresis layer 30 includes multiple electrophoresis particles 31. The liquid-blocking portion 50 is arranged at an edge of the first substrate 10 and/or the second substrate 20. The supporting structure 40 is arranged between the first substrate 10 and the second substrate 20, and the supporting structure 40 includes a first supporting portion 41 and a second supporting portion 42. A height of the first supporting portion 41 is greater than a height of the second supporting portion 42 in a direction perpendicular to a plane where the first substrate 10 is located. A minimum distance between the second supporting portion 42 and the liquid-blocking portion 50 is less than a minimum distance between the first supporting portion 41 and the liquid-blocking portion 50.

The first substrate 10 and the second substrate 20 may both be used as carriers for carrying part of the layer structure in the display panel. One of the first substrate 10 and the second substrate 20 is located at a light-out side of the display panel, and the other is located at a backlight side of the display panel. In order to facilitate the expression, the embodiments of the present disclosure are subsequently illustrated with the first substrate 10 being located at the backlight side of the display panel and the second substrate 20 being located at the light-out side of the display panel as an example.

The first substrate 10 may include a glass base, that is, the display panel is a rigid structure. In one embodiment, the first substrate 10 may include a flexible substrate, that is, the display panel may be a flexible structure to meet the bending needs of the display panel. The embodiments of the present disclosure are not limited to this.

The second substrate 20 is stacked on one side of the first substrate 10, the electrophoresis layer 30 is sandwiched between the first substrate 10 and the second substrate 20, the electrophoresis layer 30 includes multiple electrophoresis particles 31, and the electrophoresis particles 31 are the main components used for realizing the display effect in the display panel. For the shape and size of the electrophoresis particles 31, it is not limited in the embodiment of the present disclosure. For example, the cross-sectional shape of the electrophoresis particles 31 may be round, square, other polygonal or irregular shapes, etc. The shape of different electrophoresis particles 31 may be the same or different.

In addition to the electrophoresis particles 31, the electrophoresis layer 30 may also be provided with an electrophoresis solution, and the electrophoresis particles 31 can move relatively in the electrophoresis solution. In one embodiment, the electrophoresis particles 31 can move in the transparent or colored electrophoresis solution under the influence of external electric field and other factors, and with the help of the flipping or translation of the electrophoresis shell, the color and brightness of the display panel can be adjusted.

The liquid-blocking portion 50 is arranged at the edge of at least one of the first substrate 10 and the second substrate 20. The liquid-blocking portion 50 may be arranged in the same layer with the electrophoresis solution, and the liquid-blocking portion 50 can block the flow of the electrophoresis solution, to package the electrophoresis solution. Further, the surface of the first substrate 10 facing the second substrate 20 and the surface of the second substrate 20 facing the first substrate 10 need to be in contact with the liquid-blocking portion 50, to reduce the risk that there is a gap between at least one of the first substrate 10 and the second substrate 20 and the liquid-blocking portion 50, and improve the packaging reliability of the electrophoresis solution by the liquid-blocking portion 50.

The supporting structure 40 is arranged between the first substrate 10 and the second substrate 20, that is, the supporting structure 40 is arranged in the same layer with the electrophoresis particles 31 and the electrophoresis solution. The supporting structure 40 can support the display panel. In conventional technology, the supporting structure 40 only includes supporting portions with the same height. During the use of the display panel, since the height of each position of the supporting portion is relatively small, when the second substrate 20 is pressed and deformed, the supporting portion cannot contact with the second substrate 20 in time, so the second substrate 20 is prone to excessive deformation, and can also make the electrophoresis solution be excessively deformed with the second substrate 20, and finally causes the electrophoresis particles 31 to move relatively, affects the display accuracy of the display panel.

In the embodiments of the present disclosure, the supporting structure 40 is further provided with a first supporting portion 41 with a larger height, and the supporting structure 40 includes a first supporting portion 41 and a second supporting portion 42 with different heights. For the specific height and size of the first supporting portion 41, it is not limited in the embodiment of the present disclosure. In an embodiment, the height of the second supporting portion 42 is less than the height of the liquid-blocking portion 50, and the height of the first supporting portion 41 may be greater than the height of the liquid-blocking portion 50, or the height of the first supporting portion 41 may also be less than or equal to the height of the liquid-blocking portion 50.

In addition, the embodiment of the present disclosure does not limit the position relationship between the first supporting portion 41 and the second supporting portion 42 relative to the first substrate 10 and the second substrate 20, as well as the shape and structure corresponding to the supporting structure 40. For example, the orthographic projection of the first supporting portion 41 on the first substrate 10 may be strip-shaped, net-shaped, dot-shaped, and other shapes, and the second supporting portion 42 may be the same.

In addition, the second supporting portion 42 may be arranged on the first substrate and arranged at intervals with the second substrate 20. In one embodiment, the second supporting portion 42 may also be arranged on the second substrate 20 and arranged at intervals with the first substrate 10. The first supporting portion 41 may be arranged on the first substrate 10 and be in contact with the second substrate 20 or arranged at intervals. In one embodiment, the first supporting portion 41 may also be arranged on the second substrate 20, and be in contact with the first substrate 10 or arranged at intervals. In FIG. 1, the first supporting portion 41 and the second supporting portion 42 are both arranged at the first substrate 10.

The existence of the first supporting portion 41 contributes to improving the display accuracy of the display panel. In one embodiment, during the use of the display panel, the second substrate 20 may be deformed by pressing, and before the second substrate 20 is excessively deformed, the second substrate 20 will be in contact with the first supporting portion 41, and with the help of the supporting force of the first supporting portion 41, the deformation degree of the second substrate 20 is reduced, to reduce the risk of excessive deformation of the second substrate 20. Furthermore, the flow deformation of the electrophoresis solution and the movement degree of the corresponding electrophoresis particles 31 is reduced, the fluctuation and discoloration of the display screen caused by the movement of the electrophoresis particles 31 are reduced, and the display accuracy and display reliability of the display panel are improved.

Further, in the embodiment of the present disclosure, the minimum distance between the second supporting portion 42 and the liquid-blocking portion 50 is configured to be less than the minimum distance between the first supporting portion 41 and the liquid-blocking portion 50. That is, the second supporting portion 42 is closer to the liquid-blocking portion 50 than the first supporting portion 41, and the packaging reliability of the electrophoresis solution is better improved by the liquid-blocking portion 50.

In one embodiment, since the first supporting portion 41 has a larger height, it is necessary that there is a distance between the first substrate 10 and the second substrate 20 at the position of the first supporting portion 41. On this basis, if the first supporting portion 41 is arranged close to the liquid-blocking portion 50, the first supporting portion 41 will adversely affect the contact connection between the liquid-blocking portion 50 and the first substrate 10 and the contact connection between the liquid-blocking portion 50 and the second substrate 20 during the display panel packaging process, and it is easy to cause the risk of poor contact between at least one of the first substrate 10 and the second substrate 20 and the liquid blocking portion 50, to lead to the risk that the difficulty of packaging the display panel is increased and the packaging reliability is reduced.

In view of this, in the embodiment of the present disclosure, the minimum distance between the second supporting portion 42 and the liquid-blocking portion 50 is configured to be less than the minimum distance between the first supporting portion 41 and the liquid-blocking portion 50, and there is a distance between the first supporting portion 41 and the liquid-blocking portion 50, to reduce the influence on the difficulty and reliability of packaging for the display panel, which is caused by the first supporting portion 41.

It should be noted that, in conjunction with FIG. 1, the liquid-blocking portion 50 may be in a ring structure. In this case, the minimum distance between the second supporting portion 42 and the liquid-blocking portion 50 in the horizontal direction should be less than the minimum distance between the first supporting portion 41 and the liquid-blocking portion 50 in the horizontal direction. The minimum distance between the second supporting portion 42 and the liquid-blocking portion 50 in the vertical direction also should be less than the minimum distance between the first supporting portion 41 and the liquid-blocking portion 50 in the vertical direction.

To sum up, in the embodiment of the present disclosure, on the basis of the second supporting portion 42, a first supporting portion 41 is further provided, and the supporting effect corresponding to the supporting structure 40 can be improved with the help of the first supporting portion 41, to reduce the risk of excessive deformation of at least one of the first substrate 10 and the second substrate 20, to reduce the probability of the movement of the electrophoresis particles 31 and improving the display accuracy and display reliability of the display panel. At the same time, in the embodiment of the present disclosure, a distance between the first supporting portion 41 and the liquid-blocking portion 50 is also provided, to reduce the influence of the first supporting portion 41 on the liquid-blocking portion 50, to reduce the difficulty of packaging the display panel and improving the packaging reliability of the display panel.

Figure 3:
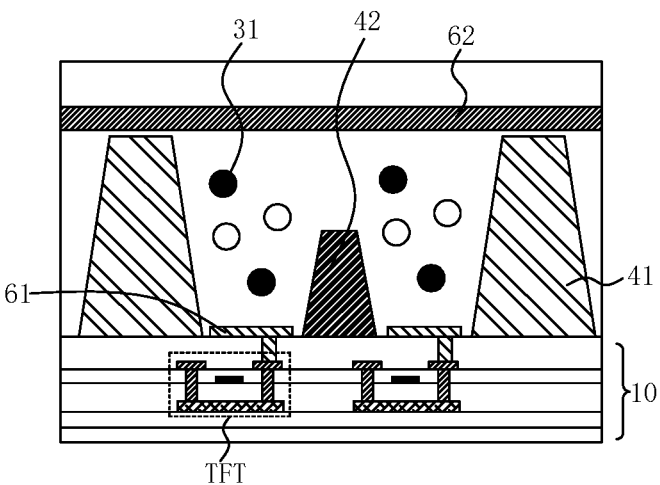
FIG. 3 is a schematic diagram of a cross-sectional structure of a display panel according to another embodiment of the present disclosure.

The first substrate 10 may contain multiple layer structures, which is not limited in the embodiment of the present disclosure. In an embodiment, reference is made to FIG. 3, the first substrate 10 may include a multilayer conductive structure with a stacked arrangement, and some conductive structures may be jointly composed of a thin-film transistor TFT to drive the electrode to run and meet the moving needs of the electrophoresis particles 31.

Figure 4:
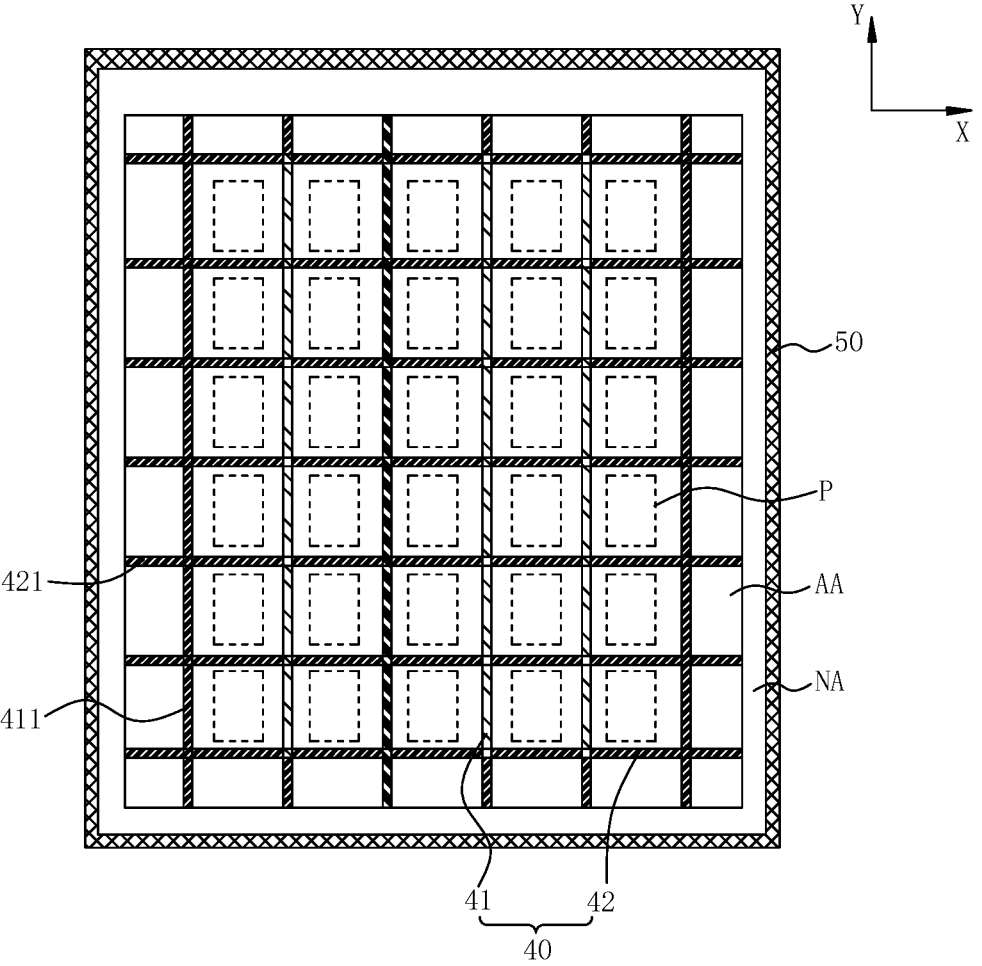
FIG. 4 is a structural schematic diagram of a display panel according to another embodiment of the present disclosure.

In addition, besides the structure shown in FIG. 1, the supporting structure 40 may be a variety of other structures. For example, the supporting structure 40 may be the structure shown in FIG. 4, that is, the first supporting portion 41 and the second supporting portion 42 may be enclosed together to form a network structure.

In some embodiments, as shown in FIG. 1 and FIG. 2, the first supporting portion 41 includes multiple first supporting bars 411 arranged at intervals along the first direction X, and the first direction X is parallel to the plane where the first substrate 10 is located.

The first supporting portion 41 includes multiple first supporting bars 411 arranged at intervals, and a second supporting portion 42 may be arranged or not be arranged between adjacent first supporting bars 411, which is not limited in the embodiment of the present disclosure. The orthographic projection of each first supporting bar 411 on the first substrate may be a strip-shaped structure, and for the specific size and shape of the first supporting bar 411, it is not limited in the embodiment of the present disclosure. In an embodiment, the orthographic projection of the first supporting bar 411 on the first substrate 10 may be a straight line structure, or a curved structure, or a polyline structure, etc.

Further, the size and shape of different first supporting bars 411 may be the same, or the size and shape of different first supporting bars 411 may be different. The extension directions of different first supporting bars 411 may be the same, or may also be different. In an embodiment, the extension direction of the first supporting bar 411 intersects with the first direction X.

In the embodiment of the present disclosure, a single first supporting bar 411 can enhance the supporting strength of the display panel in the extension direction of the first supporting bar 411, and the strength of the display panel at a specific area can be improved by controlling the extension direction and the extension length of the first supporting bar 411, to reduce the risk of excessive deformation of the second substrate 20 at the specific area, and improve the reliability of the display panel.

Figure 5:
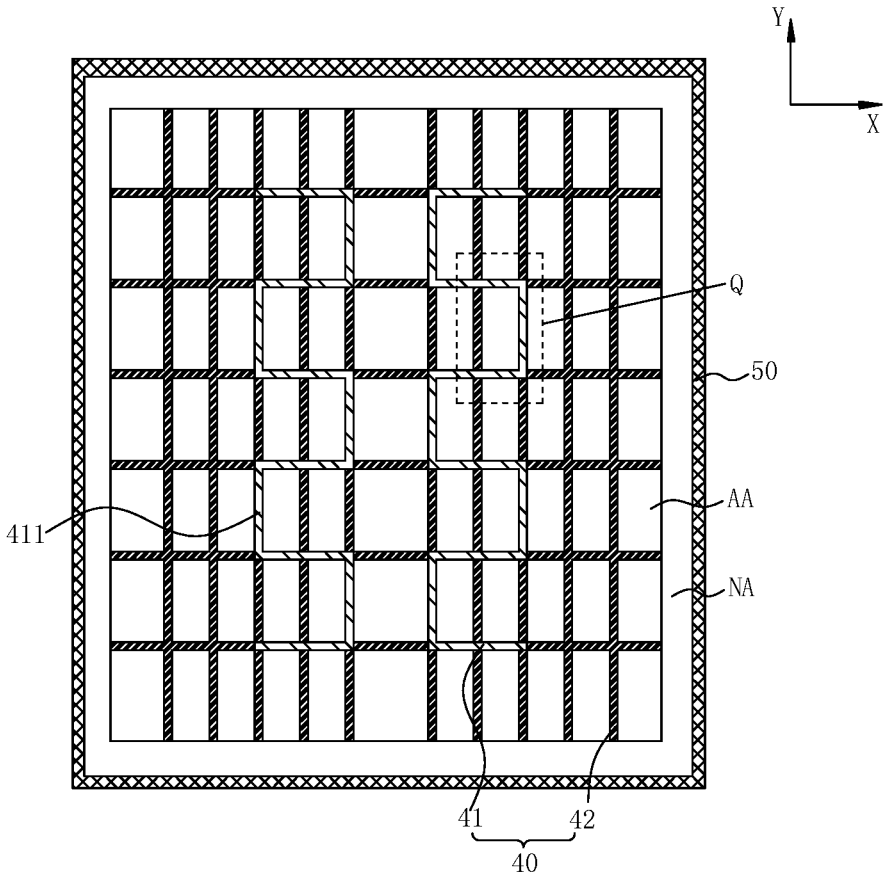
FIG. 5 is a structural schematic diagram of a display panel according to another embodiment of the present disclosure.
Figure 6:
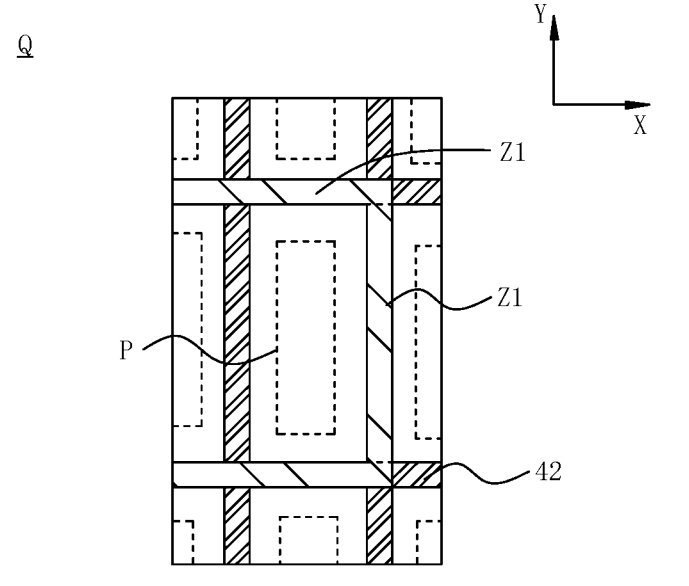
FIG. 6 is a schematic diagram of an enlarged structure at area Q in FIG. 5.

In some embodiments, references are made to FIG. 5 and FIG. 6. The first supporting bar 411 includes multiple first supporting segments Z1 connected to each other and at least part of the first supporting segments Z1 extend in different directions.

The first supporting bar 411 includes multiple first supporting segments Z1, the orthographic projection of the first supporting section Z1 on the first substrate 10 may be a straight line structure, and the extension lengths corresponding to different first supporting segments Z1 may be the same or different. At least part of the first supporting segments Z1 extend in different directions. In other words, at least part of the extension directions of the two adjacent first supporting segments Z1 intersects. In an embodiment, the extension directions of adjacent first supporting segments Z1 are perpendicular to each other.

In the embodiment of the present disclosure, according to the different actual needs of the display panel, multiple first supporting segments Z1 with different extension directions may be arranged in the first supporting bar 411, and a single first supporting bar 411 can be extended to different positions of the display panel, and the supporting effect of the first supporting bar 411 on different positions of the display panel can be improved, to further improve the reliability of the display panel.

In some embodiments, as shown in FIG. 1 and FIG. 5, the extension directions of at least part of the first supporting bars 411 are parallel to each other.

According to the above, the orthographic projection of the first supporting bar 411 on the first substrate 10 may be a straight line structure, a curved line structure or a polyline structure. As shown in FIG. 1, when the orthographic projection of the first supporting bar 411 on the first substrate 10 is the straight line structure, the extension direction of the first supporting bar 411 may be parallel to the straight line structure. In one embodiment, as shown in FIG. 5, when the orthographic projection of the first supporting bar 411 on the first substrate 10 is the polygonal structure, the extension direction of the first supporting bar 411 may be the direction corresponding to the extension trend of the first supporting bar 411 itself.

In the embodiment of the present disclosure, the extension directions of at least part of the first supporting bars 411 may be configured to be the same according to the actual use of the display panel, and the supporting strength of the display panel at different positions in the extension direction is further improved, and the reliability of the display panel is further improved.

For the extension direction of the first supporting bar 411, it is not limited in the embodiment of the present disclosure. In an embodiment, in the case of a mobile phone-like display device, the display device may be rectangular with adjacent long and short sides. The user usually swipes the screen along the long or short side of the display device to control the display device. On this basis, the extension direction of the first supporting bar 411 may be configured to be parallel to the long side direction or the short side direction, to ensure that in the subsequent use of the display device, the support of the first supporting bar 411 can be better obtained at the area corresponding to the sliding operation of the display device, to reduce the risk of displacement of the electrophoretic particles 31 and improving the display reliability, which has strong practicality.

Figure 7:
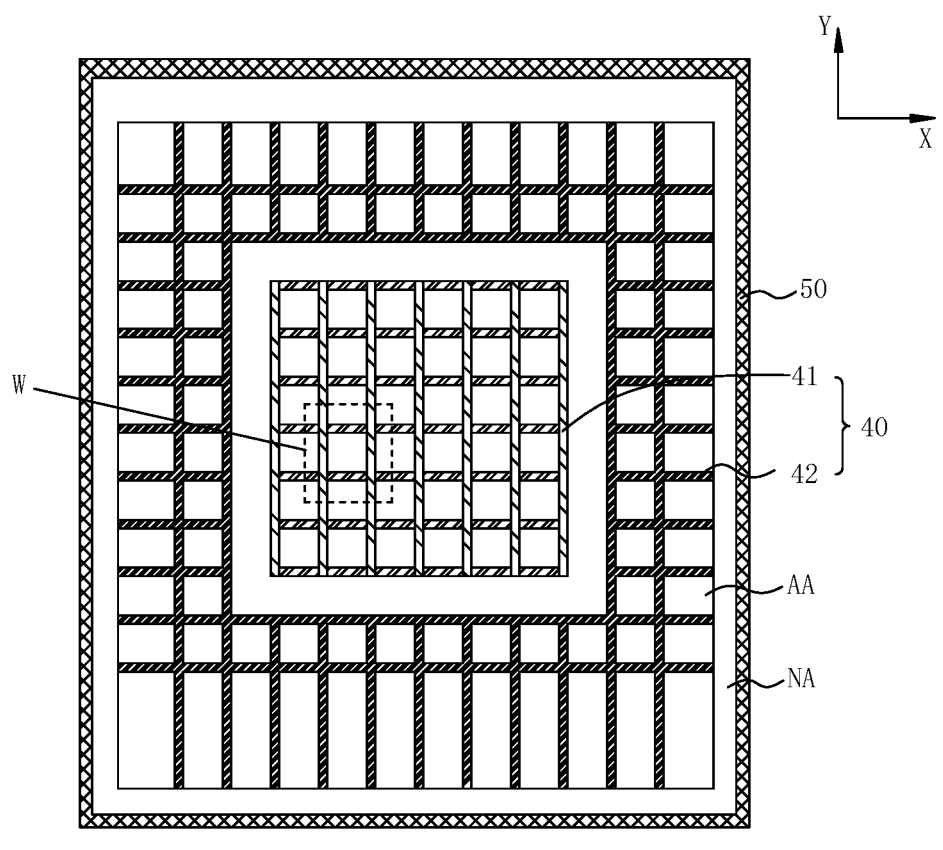
FIG. 7 is a structural schematic diagram of a display panel according to another embodiment of the present disclosure.
Figure 8:
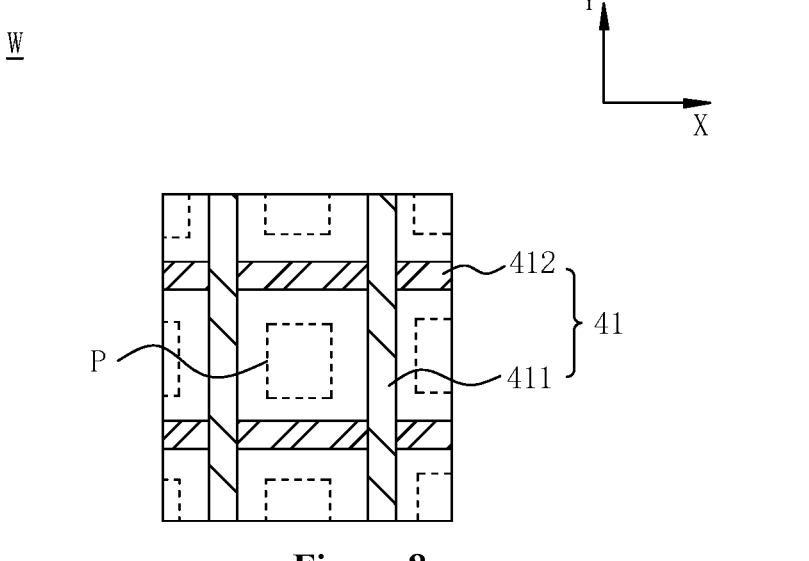
FIG. 8 is a schematic diagram of an enlarged structure at area W in FIG. 7.

In some embodiments, references are made to FIG. 7 and FIG. 8. The first supporting bar 411 extends along the second direction Y. The first supporting portion 41 further includes a second supporting bar 412 arranged at intervals along the second direction Y and extending along the first direction X, where the first direction X intersects with the second direction Y.

The first direction X and the second direction Y are parallel to the direction of the plane where the substrate is located, and the embodiment of the present disclosure does not limit the range of angles between the first direction X and the second direction Y. In an embodiment, the first direction X is perpendicular to the second direction Y.

Similar to the first supporting bar 411, the orthographic projection of the second supporting bar 412 on the first substrate 10 may be a straight line structure, a curved line structure or a polyline structure. When the orthographic projection of the second supporting bar is the straight line structure on the first substrate 10, the extension direction of the second supporting bar 412 may be parallel to the straight line structure. When the orthographic projection of the second supporting bar 412 on the first substrate 10 is the curved structure or the polyline structure, the extension direction of the second supporting bar 412 may be the direction corresponding to the extension trend of the second supporting bar 412 itself.

The first supporting bar 411 extends along the first direction X, and multiple first supporting bars 411 are arranged at intervals in the second direction Y. The second supporting bar 412 extends along the second direction Y, and multiple second supporting bars 412 are arranged at intervals in the first direction X. At least part of the second supporting bars 412 is connected with the first supporting bars 411, or at least part of the second supporting bars 412 is arranged at intervals with the first supporting bars 411.

Figure 9:
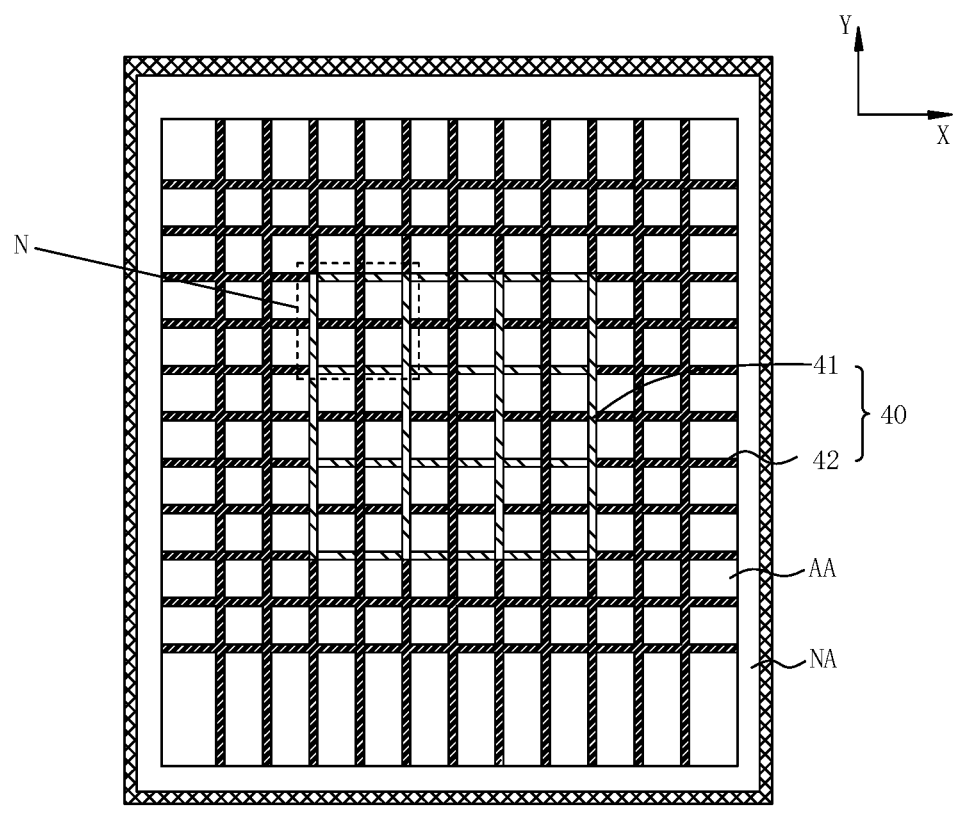
FIG. 9 is a structural schematic diagram of a display panel according to another embodiment of the present disclosure.

In an embodiment, the first supporting bar 411 is connected with the second supporting bar 412 and arranged in one piece, and the orthographic projection of the first supporting portion 41 on the first substrate 10 is a network structure. In addition, in the embodiment of the present disclosure, besides the structure shown in FIG. 6, the first supporting portion 41 and the second supporting portion 42 may also be a variety of structures, for example, the first supporting portion 41 and the second supporting portion 42 may also form a network structure as shown in FIG. 9.

In the embodiments of the present disclosure, a second supporting bar 412 is further provided in the first supporting portion 41 besides the first supporting bar 411. The extension directions of the first supporting bar 411 and the second supporting bar 412 are different, and the first supporting portion 41 can extend to different areas in the display panel, and the range covered by the first supporting portion 41 in the display panel is expanded, to improve the supporting strength of the display panel in different areas.

In some embodiments, references are made to FIG. 5 to FIG. 8. The display panel includes multiple pixels P arranged in an array, and at least one of the first supporting portion 41 and the second supporting portion 42 is enclosed on the peripheral side of pixel P.

The pixel P is the smallest unit that constitutes the display screen, and a single pixel P may include only one electrophoresis particle 31, or a single pixel P may also include multiple electrophoretic particles 31, which is not limited in the embodiment of the present disclosure. In an embodiment, as shown in FIG. 2, the display panel further includes a first electrode 61 and a second electrode 62. One of the first electrode 61 and the second electrode 62 is located between the first substrate 10 and the electrophoresis layer 30, and the other is located between the second substrate 20 and the electrophoresis layer 30. The number of the first electrode 61 may be multiple, the orthographic projection of the pixel P on the first substrate 10 may be located in the orthographic projection of the first electrode 61 on the substrate, that is, the pixel P and the first electrode 61 may be arranged one-to-one. Further, the second electrode 62 may be a planar electrode, and the orthographic projection of a single second electrode 62 on the first substrate 10 simultaneously covers the orthotropic projection of multiple pixels P on the first substrate 10.

The first electrode 61 and the second electrode 62 are used together to drive and control the electrophoresis particles 31 in the pixel P. For example, the electrophoresis particles 31 carry an electric charge themselves. During the use of the display panel, an electric field can be formed between the first electrode 61 and the second electrode 62, and under the effect of the electric field, the electrophoresis particles 31 can be relatively close to or far away from the first electrode 61, to achieve the switching of the display panel.

The first supporting portion 41 and the second supporting portion 42 are both used for supporting purpose. Based on this, in the embodiment of the present disclosure, at least one of the first supporting portion 41 and the second supporting portion 42 is enclosed around the peripheral side of the pixel P, and the restriction of the position of the pixel P can be realized with the help of at least one of the first supporting portion 41 and the second supporting portion 42, and the risk that the electrophoresis particles 31 corresponding to adjacent pixel P are excessively concentrated in a single area range can be reduced, and the display reliability is improved. At the same time, at least one of the first supporting portion 41 and the second supporting portion 42 is located on the peripheral side of the pixel P, which can also better support and protect the pixel P.

For the specific position relationship between the first supporting portion 41, the second supporting portion 42 and the pixel P, it is not limited in the embodiment of the present disclosure. In an embodiment, as shown in FIG. 5 and FIG. 9, the first supporting portion 41 and the second supporting portion 42 may be enclosed together to form a network structure, and at least part of the meshes within the network structure can be used to accommodate one or more pixels P. In one embodiment, as shown in FIG. 7, only the first supporting portion 41 is used to be enclosed to form the network structure, and a small part of the meshes in the network structure can be used to accommodate one or more pixels P.

In some embodiments, as shown in FIG. 8, multiple pixels P are arranged side by side along the second direction Y between the adjacent first supporting bars 411.

From the above, the first supporting bar 411 is a strip-shaped structure and can be extended along the second direction Y, and multiple first supporting bars 411 can be arranged at intervals along the first direction X. In an embodiment, the first direction X is perpendicular to the second direction Y, and the first direction X and the second direction Y can represent the column direction and row direction of the pixel P arrangement, respectively.

Further, in the embodiment of the present disclosure, by adjusting the extension length of the first supporting bar 411 in the second direction Y, a single first supporting bar 411 can be located on the same side of multiple pixels P arranged side by side in the second direction Y. By utilizing the same first support bar 411 to achieve the support for multiple pixels P, the number of the first supporting bars 411 in the display panel can be reduced while ensuring the reliability of the support, to reduce the preparation difficulty of the first supporting bar 411.

Similarly, in other embodiments, multiple pixels P arranged side by side along the first direction X may also be arranged between the adjacent second supporting bars 412.

Figure 10:
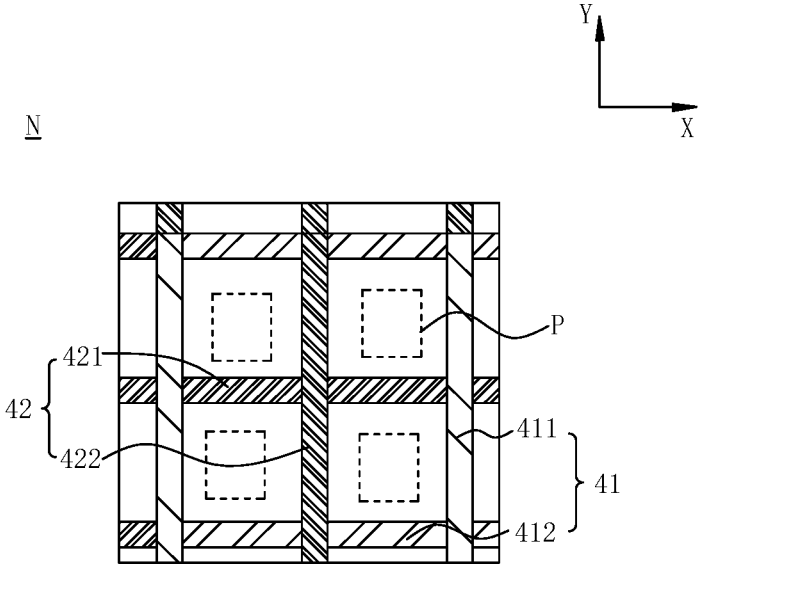
FIG. 10 is a schematic diagram of an enlarged structure at area N in FIG. 9.

In some embodiments, references are made to FIG. 9 and FIG. 10. The second supporting portion 42 includes a third supporting bar 421 extending along the first direction X, and the third supporting bar 421 is located between the adjacent first supporting bars 411 to separate the multiple pixels P arranged side by side in the second direction Y.

The second supporting portion 42 includes the third supporting bar 421, the third supporting bar 421 extends along the first direction X, the first supporting bar 411 extends along the second direction Y, and the third supporting bar 421 is located between adjacent first supporting bars 411. In this case, two adjacent first supporting bars 411 and two adjacent third supporting bars 421 can jointly form an accommodating cavity, which can be used to accommodate one or more pixels P. The third supporting bar 421 may be connected with at least one of the two adjacent first supporting bars 411, or the third supporting bar 421 may be arranged at intervals with the adjacent two first supporting bars 411.

In the embodiment of the present disclosure, by arranging a third support bar 421 between two adjacent first supporting bars 411, it is possible to form an accommodating cavity together with two first supporting bars 411 and two third supporting bars 421. The presence of the accommodating cavity better separates different pixels P, ensuring that at least part of the pixels P can work independently in the accommodating cavity, to reduce the risk of abnormal display of the display panel caused by the mutual influence of different pixels P, and improving the display accuracy of the display panel.

Similarly, in other embodiments, the second supporting portion 42 includes a fourth supporting bar 422 extending along the second direction Y, and the fourth supporting bar 422 is located between adjacent second supporting bars 412 to separate multiple pixels P arranged side by side in the first direction X.

It should be noted that, the first supporting portion 41 may include a first supporting bar 411 and a second supporting bar 412, and the second supporting portion 42 may include a third supporting bar 421 and a fourth supporting bar 422. The length of the first supporting bar 411 and the second supporting bar 412 may be the same or may be different, and the height of the first supporting bar 411 at different positions can be consistent, or there may be certain differences. Similarly, the length of the third supporting bar 421 and the fourth supporting bar 422 may be the same or may be different, and the height of the third supporting bar 421 at different positions may be consistent, or there may be certain differences. It is not limited in the present disclosure, as long as the minimum height in the first supporting portion 41 is greater than the maximum height in the second supporting portion 42.

Figure 11:
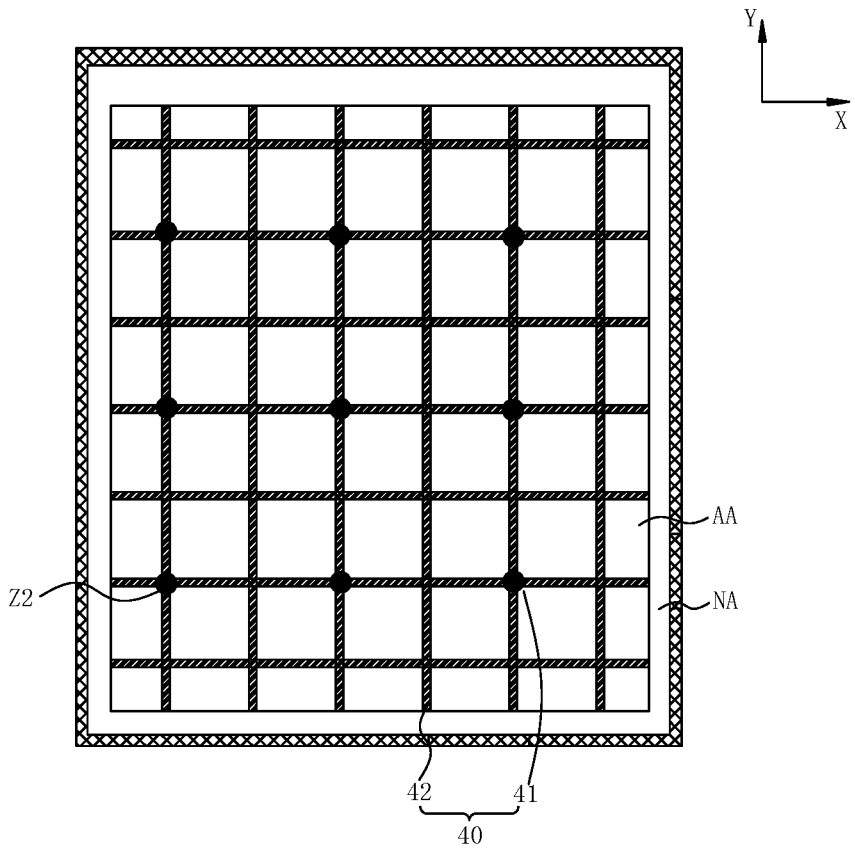
FIG. 11 is a structural schematic diagram of a display panel according to another embodiment of the present disclosure.

In some embodiments, as shown in FIG. 11, the first supporting portion 41 includes multiple first supporting columns Z2 arranged at intervals.

The first supporting column Z2 is a columnar structure, its orthographic projection on the first substrate 10 may be a point-like structure, and multiple first supporting columns Z2 can be arranged in different areas of the display panel. Further, the density of the first supporting column Z2 in different areas can be adjusted adaptively according to the practical requirements of the display panel. For example, in areas with frequent pressing, the number of the first supporting column Z2 can be increased to improve the supporting strength of the supporting structure 40 in this area.

In the embodiment of the present disclosure, by configuring the first supporting portion 41 to include multiple first supporting columns Z2, the number of the first supporting columns Z2 in different areas can be adjusted as needed, to strengthen the support at the specific position on the display panel. Compared with other methods, the arrangement of the first supporting column Z2 can reduce the material cost corresponding to the first supporting portion 41, and has strong flexibility and applicability.

In some embodiments, as shown in FIG. 1 and FIG. 2, the display panel includes a display area AA and a non-display area NA. The non-display area NA at least partially surrounds the display area AA, the liquid-blocking portion 50 is arranged within the non-display area NA, and the first supporting portion 41 and the second supporting portion 42 are arranged within the display area AA.

The display panel includes at least two areas: the display area AA and the non-display area NA. The display area AA is the area in the display panel that is used to achieve the display function, and the non-display area NA is the area in the display panel that cannot achieve the display function. For the specific size and shape of the display area AA and the non-display area NA, it is not limited in the embodiment of the present disclosure. In an embodiment, the display area AA can be a square structure and the non-display area NA can be a square ring structure. In one embodiment, the display area AA can be a circular structure, and the non-display area NA can be a circular ring structure.

The electrophoresis particles 31 are arranged in the display area AA of the display panel. As mentioned above, the second substrate 20 in the display panel may be deformed under the influence of external forces and other factors, to cause the electrophoresis particles 31 to move relatively, and causing the problem of display abnormalities. In order to reduce the probability of the occurrence of the above-mentioned problem, the first supporting portion 41 and the second supporting portion 42 are arranged in the display area AA in the embodiment of the present disclosure, and the first supporting portion 41 and the second supporting portion 42 can be arranged near the electrophoresis particles 31, to reduce the risk of deformation of the surrounding environment of the electrophoretic particles 31, reducing the risk of movement of the electrophoretic particles 31, and improving the display reliability of the display panel.

The liquid-blocking portion 50 is used to prevent excessive flow of the electrophoresis solution and can also serve as a packaging effect. On this basis, the liquid-blocking portion 50 is arranged within the non-display area NA, which can reduce the influence of the liquid-blocking portion 50 on the display effect in the display area AA and improve the user experience. Furthermore, the liquid-blocking portion 50 is arranged within the non-display area NA, and the first supporting portion 41 is arranged within the display area AA, and the distance between the liquid-blocking portion 50 and the first supporting portion 41 can be increased in the plane parallel to the substrate, the influence of the first supporting portion 41 on the liquid-blocking portion 50 is reduced, the connection reliability of the first substrate 10 and the second substrate 20 with liquid-blocking portion 50 is improved, and it is helpful for reducing the difficulty of packaging corresponding to the display panel.

Figure 12:
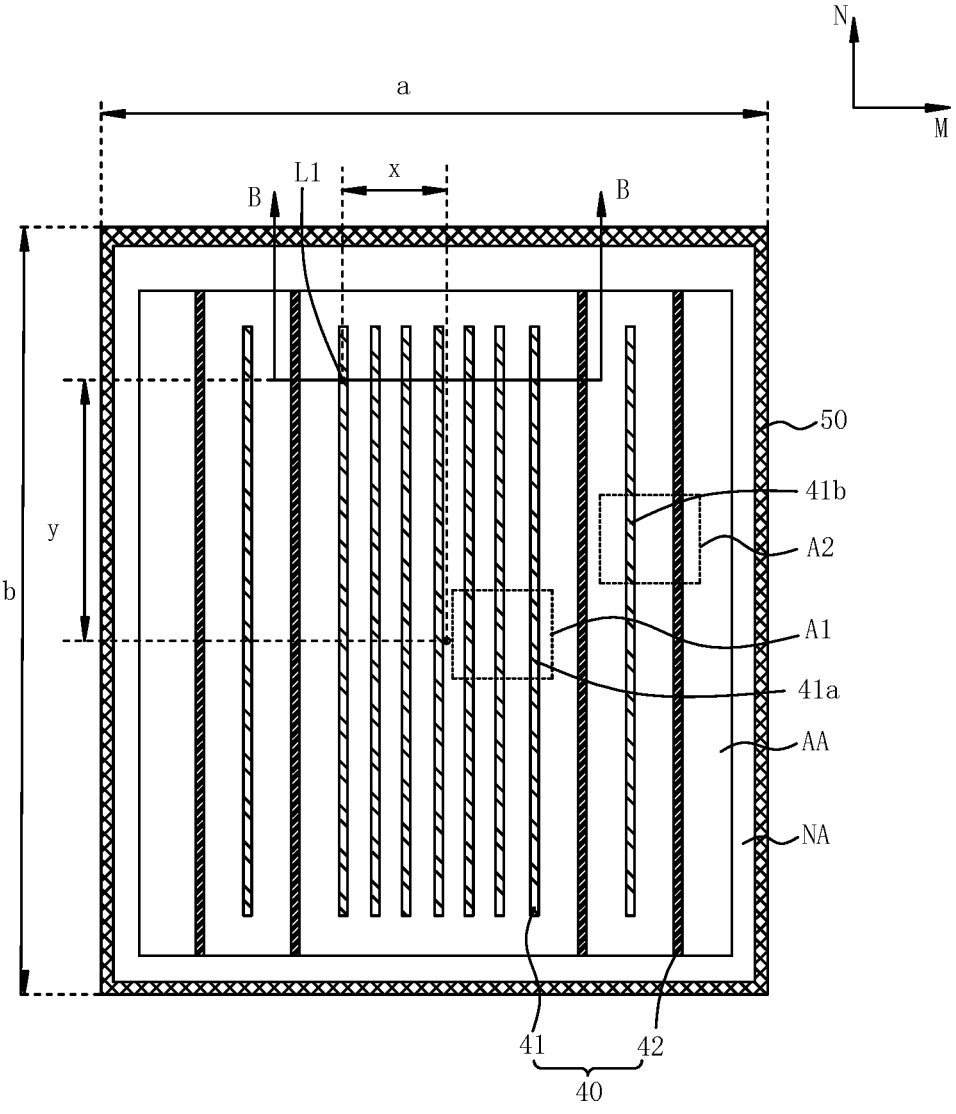
FIG. 12 is a structural schematic diagram of a display panel according to another embodiment of the present disclosure.
Figure 13:
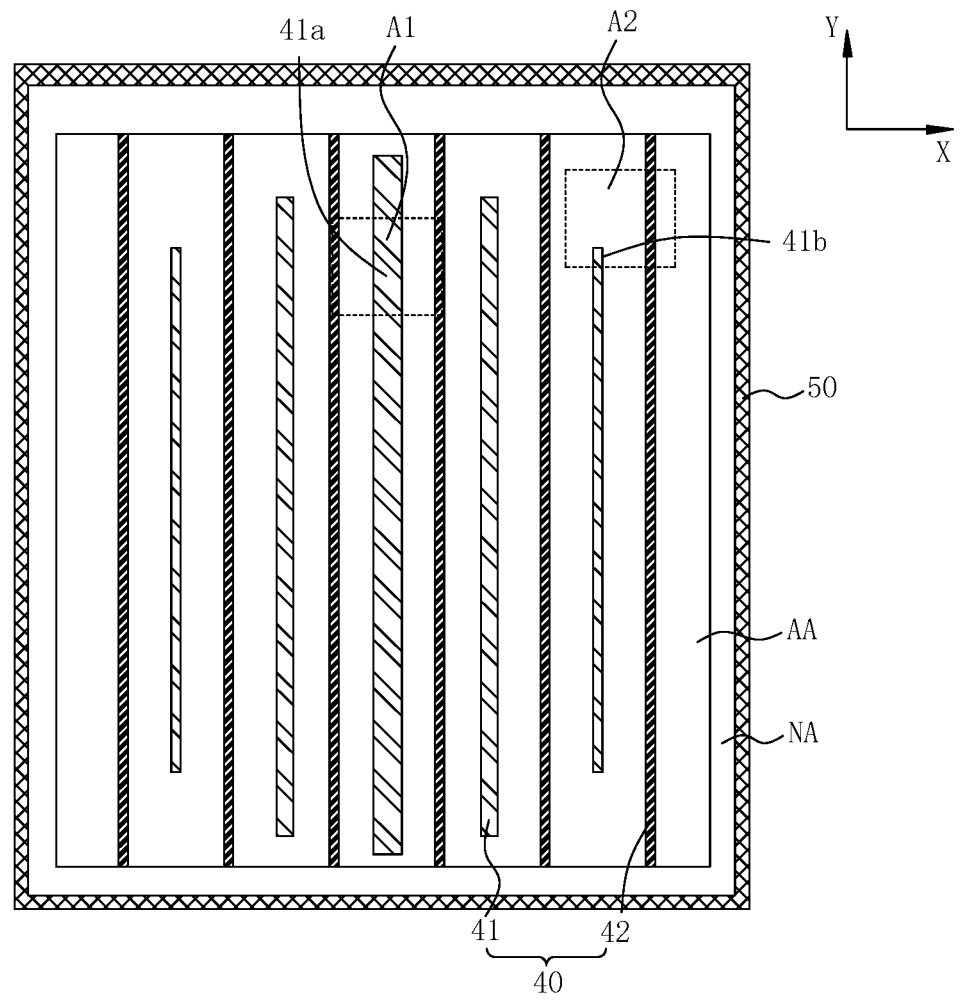
FIG. 13 is a structural schematic diagram of a display panel according to another embodiment of the present disclosure.

In some embodiments, references are made to FIG. 12 and FIG. 13. The display area AA includes the first area A1 and the second area A2. The distance between the center of the first area A1 and the center of the display area AA is less than the distance between the center of the second area A2 and the center of the display area AA. The first supporting portion 41 includes a first supporting sub-portion 41*a* located in the first area A1 and the second supporting sub-portion 41*b* located in the second area A2. The distribution density of the first supporting sub-portion 41*a* is greater than the distribution density of the second supporting sub-portion 41*b*, and/or, the orthographic projection of the first supporting sub-portion 41*a* on the first substrate 10 per unit area is greater than the orthographic projection of the second supporting sub-portion 41*b* on the first substrate 10 per unit area.

The display area AA includes at least the first area A1 and the second area A2. The first area A1 is closer to the central area of the display area AA than the second area A2, and the second area A2 is closer to the non-display area NA than the first area A1. For the specific shape and size of the first area A1 and the second area A2, it is not limited in the embodiment of the present disclosure. In an embodiment, as shown in FIG. 12, the first area A1 and the second area A2 may both be block-like structures. In one embodiment, the second area A2 may also be arranged around the first area A1.

During the use of the display panel, the center area of the display panel is usually more susceptible to user pressure and touch compared to the edge area. During the long-term use of the display panel, the deformation at the center of the display panel is also greater than the deformation at the edge of the display panel.

In view of this, the design for the first supporting portion 41 in the first area A1 is different from that in the second area A2 in the present disclosure. In one embodiment, the distribution density of the first supporting sub-portion 41a located in the first area A1 is configured to be greater than the distribution density of the second supporting sub-portion 41b located in the second area A2. The distribution density of the first supporting sub-portion 41a mentioned in the embodiment of the present disclosure refers to the number of first supporting sub-portions 41a per unit area. Similarly, the distribution density of the second supporting sub-portion 41b refers to the number of second supporting sub-portions 41b per unit area. The orthographic projection area of a single first supporting sub-portion 41a on the first substrate may be the same as the orthographic projection area of a single second supporting sub-portion 41b on the first substrate 10, or may be different, which is not limited in the embodiment of the present disclosure.

In the embodiment of the present disclosure, by configuring the distribution density of the first supporting sub-portion 41a to be greater than that of the second supporting sub-portion 41b, more first supporting sub-portions 41a *can be arranged in the first area* A1 per unit area than that in the second area A2. With the help of a larger number of first supporting sub-portions 41a, the supporting strength for the first area A1 of the display panel may be improved, to enable the first area A1 to bear more external force, reducing the risk of deformation of the first area A1, and improving the display reliability and display accuracy.

Of course, in addition to adjusting the distribution density, the orthographic projection area of the first supporting portion 41 on the first substrate 10 can also be increased in the embodiment of the present disclosure. In one embodiment, the orthographic projection of the first supporting sub-portion 41a on the first substrate 10 per unit area can be configured to be greater than the orthographic area of the second supporting subpart 41b on the first substrate 10 per unit area. The orthographic area of the first supporting sub-portion 41a and the second supporting sub-portion 41b on the first substrate 10 are usually related to their corresponding length and width dimensions.

For example, the length of the first supporting sub-portion 41a may be greater than the length of the second supporting sub-portion 41b, and the width of the first supporting sub-portion 41a is equal to the width of the second supporting sub-portion 41b. In one embodiment, the width of the first supporting sub-portion 41a may be greater than the width of the second supporting sub-portion 41b, and the length of the first supporting sub-portion 41a is equal to the length of the second supporting sub-portion 41b. In one embodiment, the width and length of the first supporting sub-portion 41a may both be greater than the width and length of the second supporting sub-portion 41b. This is not limited in the embodiment of the present disclosure, as long as the orthographic projection area of the first supporting sub-portion 41a on the first substrate 10 per unit area is larger than the orthographic projection area of the second supporting sub-portion 41b on the first substrate 10 per unit area. FIG. 13 shows that the width and length of the first supporting sub-portion 41a are both greater than the width and length of the second supporting sub-portion 41b.

In the embodiment of the present disclosure, by adjusting the orthographic projection area corresponding to the first supporting sub-portion 41a and the second supporting sub-portion 41b per unit area, the first supporting sub-portion 41a can correspond to a larger orthographic projection area in the first area A1 per unit area, to improve the supporting strength of the first supporting sub-portion 41a for the first area A1, enabling the first area A1 to bear more external force, reducing the risk of deformation of the first area A1, and improving the display reliability and display accuracy.

Figure 14:
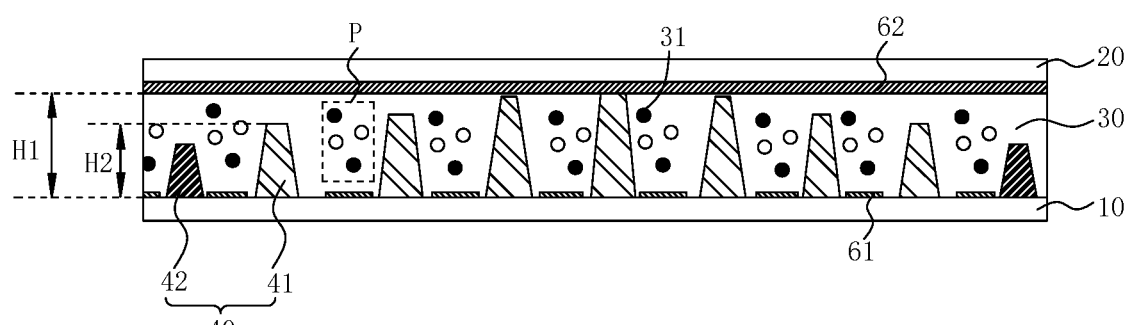
FIG. 14 is a schematic diagram of a cross-sectional structure at position B-B in FIG. 12.

In some embodiments, reference is made to FIG. 14. The height of the first supporting portion 41 decreases gradually in the direction from the center of the display panel to the edge of the display panel.

As can be seen from the above, the center of the display panel is more susceptible to user pressure and touch than the edge, so the center of the display panel will be subjected to greater external stress and more prone to deformation.

In view of this, in addition to adjusting the distribution density and the corresponding orthographic projection area of the first supporting portion 41, the height of the first supporting portion 41 can also be adjusted, and the height of the first supporting portion 41 gradually decreases in the direction from the center of the display panel to the edge. That is, the closer it is to the center of the display panel, the higher the height of the first supporting portion 41, and the closer it is to the liquid-blocking portion, the smaller the height of the first supporting portion 41.

This design can further improve the supporting strength of the first supporting portion 41 at the center position of the display panel, to further reduce the risk of abnormal movement of the electrophoretic particles 31 at the center position of the display panel, and improving the display reliability. Since as the position closer to the liquid-blocking portion 50 is, the height of the first supporting portion 41 is smaller. Therefore, this also helps to further reduce the impact of the first supporting portion 41 on the liquid-blocking portion and improve the packaging reliability of the display panel.

It should be noted that, for the specific height variation form of the first supporting portion 41, it is not limited in the embodiment of the present disclosure. In an embodiment, the height of the first supporting portion 41 decreases linearly from the center of the display panel to the edge, or it can also decrease in a gradient. It is necessary that the minimum height in the first supporting portion 41 is greater than the the maximum height in the second supporting portion 42.

In some embodiments, as shown in FIG. 12 and FIG. 14, the length of the display panel in the third direction M is a, the length of the display panel in the fourth direction N is b, the third direction M is perpendicular to the fourth direction N, the height of the liquid-blocking portion 50 is H0, the height of the first supporting portion 41 at the center of the display panel is H1, and the height of the first supporting portion 41 at the first position L1 is H2. The following formula is satisfied:

$$\frac{(H1-H0)}{4}\cos\frac{\pi x}{a}\cos\frac{\pi y}{b} + H0 \le H2 \le (H1-H0)\cos\frac{\pi x}{a}\cos\frac{\pi y}{b} + H0,$$

where x is the distance between the first position L1 and the center of the display panel in the third direction M, and y is the distance between the first position L1 and the center of the display panel in the fourth direction N.

Taking the display panel as a rectangular structure as an example, the third direction M and the fourth direction N may be the direction of the long side and the direction of the short side of the display panel respectively. For example, the third direction M may be parallel to at least one of the first direction X and the second direction Y, or the third direction M may also intersect with both the first direction X and the second direction Y. Similarly, the fourth direction N may be parallel to at least one of the first direction X and second direction Y, or the fourth direction N may intersect with both the first direction X and second direction Y.

H0 is the height of the liquid-blocking portion 50, H1 is the height of the first supporting portion 41 at the center of the display panel, and H2 is the height of the first supporting portion 41 at the first position L1. The first position L1 is a specific position in the display panel except for the center position and the position where the liquid-blocking portion 50 is located.

In the above formula, x is the distance between the first position L1 and the center of the display panel in the third direction M, and y is the distance between the first position L1 and the center of the display panel in the fourth direction N.

It should be noted that, both the values of x and y are greater than or equal to 0, and x<a, y<b, in other words, where:

$$-1 < \cos\frac{\pi x}{a}\cos\frac{\pi y}{b} < 1.$$

Further, if the first position L1 is closer to the liquid-blocking portion 50, the values corresponding to $$\frac{(H1 - H0)}{4}\cos\frac{\pi x}{a}\cos\frac{\pi y}{b} + H0 \text{ and}$$

$$(H1 - H0)\cos\frac{\pi x}{a}\cos\frac{\pi y}{b} + H0$$

will be smaller, resulting in a smaller height H2 corresponding to the first supporting 41 at the first position L1. Therefore, the height of the first supporting 41 gradually decreases in the direction from the center of the display panel to the edge. Moreover, this design in the embodiment of the present disclosure ensures that the height H2 of the first supporting portion 41 at the first position L1 is not significantly different from the height H1 of the first supporting portion 41 at the central position, to ensure the first supporting portion 41 can effectively enhance the support of the display panel at different positions of the display panel, improving the supporting reliability of the display panel, reducing the risk of display abnormalities of the display panel, and improving the display accuracy.

Figure 15:
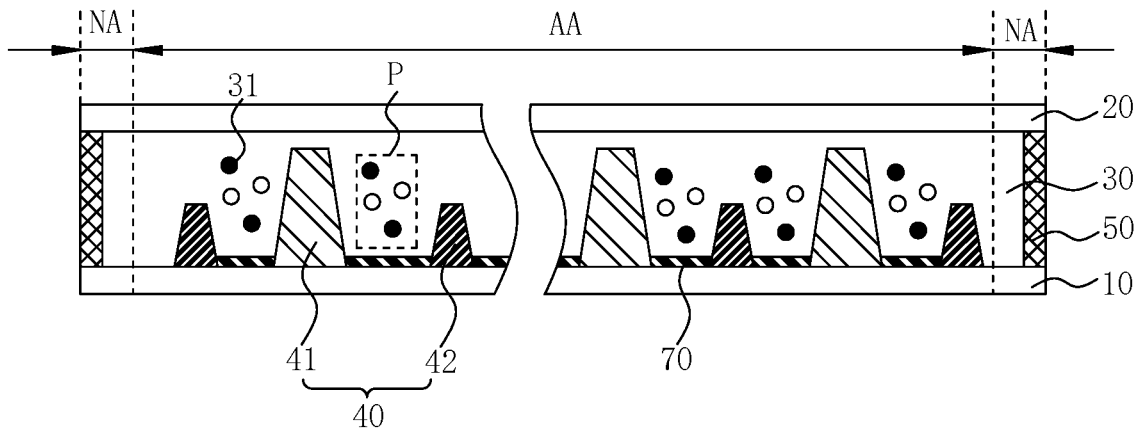
FIG. 15 is a structural schematic diagram of a display panel according to another embodiment of the present disclosure.

In some embodiments, as shown in FIG. 15, the electrophoresis layer 30 further includes a supporting layer 70, the first supporting portion 41 and the second supporting portion 42 are both connected to the supporting layer 70, and the supporting layer 70, the first supporting portion 41 and the second supporting portion 42 include the same material.

The supporting layer 70 may be arranged on the side where the first supporting portion 41 faces the first substrate 10, or the supporting layer 70 may also be arranged on the side where the first supporting portion 41 faces the second substrate 20. The first supporting portion 41 and the second supporting portion 42 are both connected to the supporting layer 70. The first supporting portion 41, the second supporting portion 42 and the supporting layer 70 can form a micro-cup structure together. There are multiple micro-cup structure accommodating cavities in the micro-cup structure for accommodating one or more electrophoresis particles 31. This design can reduce the risk of mutual influence between different electrophoresis particles 31 and improve display reliability.

The supporting structure 40 provided in the embodiment of the present disclosure can be applied to the micro-cup structure and other types of electrophoresis display panels, and it has strong flexibility and applicability. The first supporting portion 41, the second supporting portion 42 and the supporting layer 70 can be prepared and formed together with the same material in the same process, to help improve the preparation efficiency and reduce the preparation cost.

Figure 16:
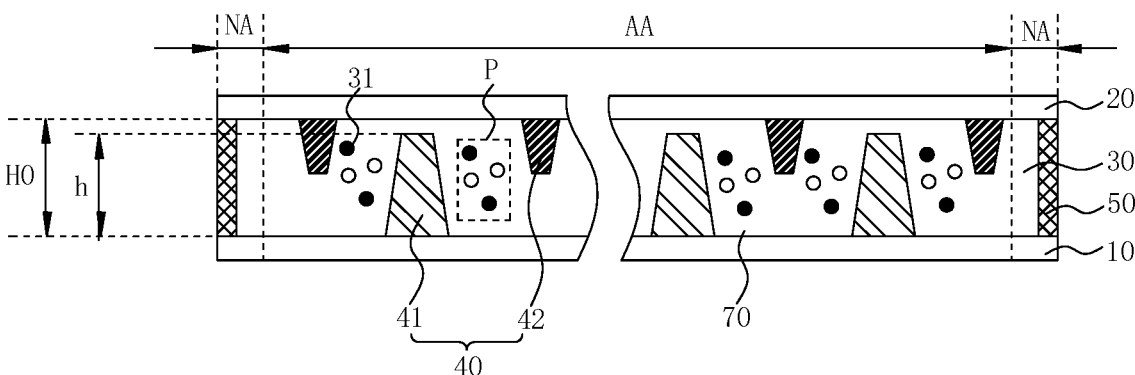
FIG. 16 is a structural schematic diagram of a display panel according to another embodiment of the present disclosure.

In some embodiments, as shown in FIG. 16, the first supporting portion 41 is arranged on the first substrate 10, and the second supporting portion 42 is arranged on the second substrate 20.

It can be seen from the above, the first substrate 10 may include multiple film layer structures with stacked arrangements. The first supporting portion 41 is arranged on the first substrate 10, that is, the first supporting portion 41 can be in contact with the film layer in the first substrate 10 which is closest to the second substrate 20. Similarly, the second substrate 20 may include multiple film layer structures with stacked arrangements. The second supporting portion 42 is arranged on the second substrate 20, that is, the second supporting portion 42 can be in contact with the film layer in the second substrate 20 which is closest to the first substrate 10.

In the display panel preparation process, the first substrate 10 and the second substrate 20 can be prepared independently. On this basis, the first supporting portion 41 is arranged on the first substrate 10, that is, the first supporting portion 41 can be prepared together with the first substrate 10. Further, the second supporting portion 42 is arranged on the second substrate 20, that is, the second supporting portion 42 can be prepared together with the second substrate 20. This design ensures that the preparation of the first supporting portion 41 is not affected by the second supporting portion 42, and the preparation of the second supporting portion 42 is not affected by the first supporting portion 41, to reduce the risk of mutual interference between the two supporting portions in the preparation process and reducing the preparation difficulty.

In some embodiments, as shown in FIG. 16, the first supporting portion 41 is arranged at intervals with the second substrate 20.

For some usage scenarios, the display panel may be configured able to be bent or curved, and the applicability of the display panel to the usage scenario is improved. For this type of display panel, if the first supporting portion 41 is arranged in contact with the first substrate 10 and the second substrate 20 at the same time, it is difficult for the display panel to be bent or curved under the support of the first supporting portion 41.

In view of this, the first supporting portion 41 is arranged at intervals with the second substrate 20 in the embodiment of the present disclosure, and there is an interval margin between the second supporting portion 42 and the second substrate 20, and the requirements of bending or curving of the display panel can be met partially, and the applicability is improved. In an embodiment, at least part of the layer in the first substrate 10 includes a flexible structure to meet the bending or curving requirements. Similarly, at least part of the layer in the second substrate 20 includes a flexible structure to meet the bending or curving requirements.

In some embodiments, as shown in FIG. 16, the cross-sectional dimensions of the first supporting portion 41 gradually decreases in the direction from the first substrate 10 to the second substrate 20, and the cross-sectional dimensions of the second supporting portion gradually increases in the direction from the first substrate 10 to the second substrate 20.

It can be seen from the above, the first supporting portion 41 is arranged on the first substrate 10, that is, the first supporting portion 41 is in contact with the first substrate 10. Therefore, in addition to making the first substrate 10 and the first support portion 41 prepared and formed together, the impact resistance of the first substrate 10 can also be improved with the help of the first supporting portion 41. Similarly, the second supporting portion 42 is arranged on the second substrate 20, that is, the second supporting portion 42 is in contact with the second substrate 20. Therefore, in addition to making the second substrate 20 and the second supporting portion 42 prepared and formed together, the impact resistance of the first substrate 10 can also be improved with the help of the second supporting portion 42

On this basis, the cross-sectional dimensions of the first supporting portion 41 and the second supporting portion 42 are adjusted in the embodiment of the present disclosure. The closer it is to the first substrate 10, the larger the cross-sectional size of the first supporting portion 41, and the first supporting portion 41 can better protect the first substrate 10. Similarly, the closer it is to the second substrate 20, the larger the cross-sectional size of the second supporting portion 42, and the second supporting portion 42 can better protect the second substrate 20.

Figure 17:
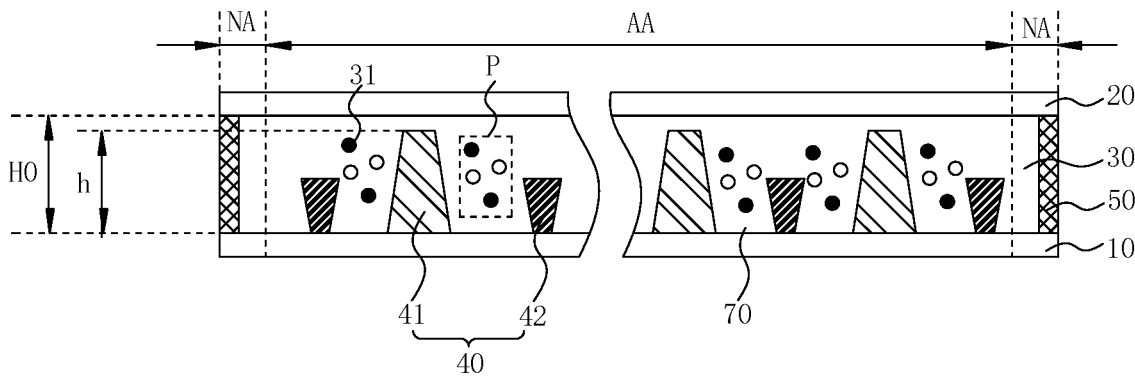
FIG. 17 is a structural schematic diagram of a display panel according to another embodiment of the present disclosure.

In other embodiments, as shown in FIG. 17, the first supporting portion 41 and the second supporting portion 42 are both arranged on the first substrate 10. The cross-sectional dimension of the first supporting portion 41 gradually decreases in the direction from the first substrate 10 to the second substrate 20, and the cross-sectional dimension of the second supporting portion 42 gradually increases in the direction from the first substrate 10 to the second substrate 20.

In some embodiments, as shown in FIG. 16, the height of the liquid-blocking portion 50 is H0, and the height of the first supporting portion 41 is h, in which H0 and h satisfy: $0.8H0 \leq h \leq 1.2H0$.

The first supporting portion 41 is used for supporting the display panel, in order to reduce the risk of display abnormality caused by the deformation of the display panel. On this basis, if the height of the first supporting portion 41 is set too large, it is easy for the height of the first supporting portion 41 to have adverse effects on the liquid-blocking portion 50. For example, it is easy to cause that the liquid-blocking portion 50 to be unable to connect and fix with at least one of the first substrate 10 and the second substrate 20, which will reduce the packaging reliability of the display panel. Therefore, the height h of the first supporting portion 41 is configured to be not exceed 1.2H0 in the embodiment of the present disclosure, to ensure the packaging reliability of the display panel.

In addition, if the height of the first supporting portion 41 is set too small, the support effect of the first supporting portion 41 is limited, and the display panel is still prone to the risk of deformation, which is not conducive to the display reliability of the display panel. In view of this, the height h of the first supporting portion 41 is also configured to be not less than 0.8H0 in the embodiment of the present disclosure, to ensure that the first supporting portion 41 can have a height dimension to meet the support requirements of the display panel, which helps to improve the display reliability.

Figure 18:
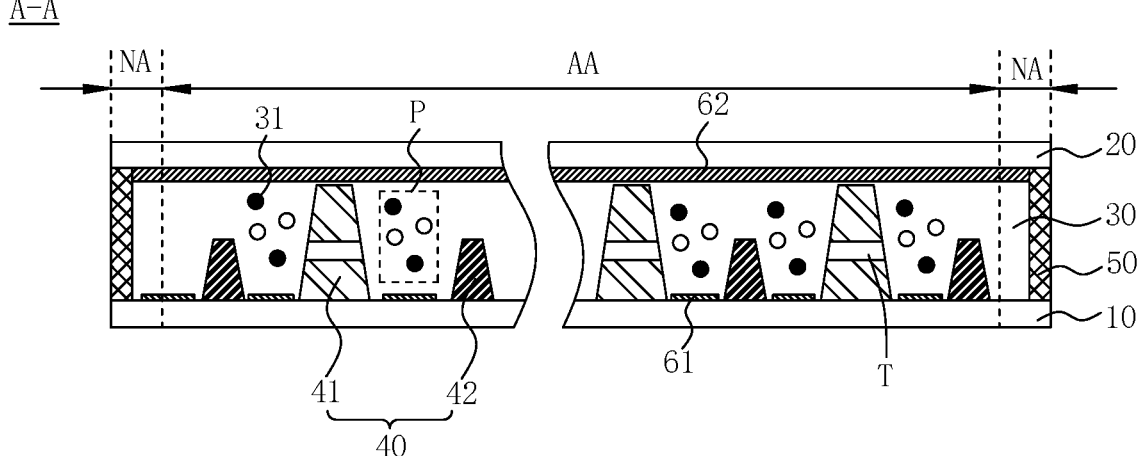
FIG. 18 is a structural schematic diagram of a display panel according to another embodiment of the present disclosure.

In some embodiments, reference is made to FIG. 18. The first supporting portion 41 is provided with a flow channel T, and in the direction parallel to the first substrate 10, the flow channel runs through the first supporting portion 41, and is configured to allow the electrophoresis particles to pass through.

In the display process of the display panel, due to the influence of factors such as screen switching, part of the electrophoresis particles 31 need to be moved. In order to meet the movement requirements of the electrophoresis particles 31, a flow channel T in the first supporting portion 41 is provided in the embodiment of the present disclosure. The flow channel T may be in a variety of forms, for example, the flow channel T may be a groove-like structure formed by a depression on the surface of the first supporting portion 41 facing the second substrate 20 towards the direction close to the first substrate 10. In one embodiment, the flow channel may be a hole-like structure, with the hole-like structure penetrating the first supporting portion 41 parallel to the plane where the first substrate 10 is located.

In the embodiment of the present disclosure, the presence of the flow channel T can meet the need for the electrophoresis particles 31 to pass through the first supporting portion 41, to realize the movement of the electrophoresis particles 31, which helps to switch the corresponding display screen of the display panel, and the display panel can have more diverse display effects and improve the display appearance.

Figure 19:
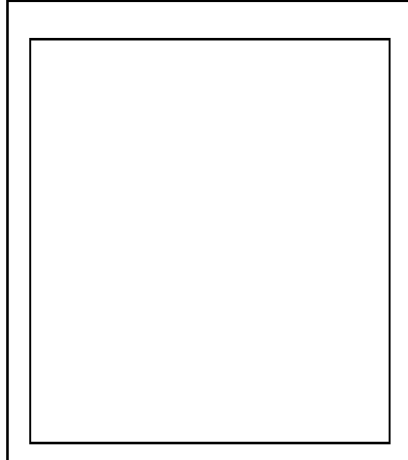
FIG. 19 is a structural schematic diagram of a display device according to an embodiment of the present disclosure.

In a second aspect, a reference is made to FIG. 19, a display device is provided according to the embodiment of the present disclosure, and the display device includes the display panel according to any one of the foregoing embodiments.

It should be noted that the display device provided in the embodiment of the present disclosure has the beneficial effect of the display panel according to any one of the above embodiments, and the details may be referred to the above descriptions of the beneficial effect of the display panel, which is not limited in the embodiment of the present disclosure.

Although the embodiments disclosed in the present disclosure are as above, the contents described are only embodiments adopted for the convenience of understanding the present disclosure and are not intended to limit the present disclosure. Modifications and changes in the form and details of the present disclosure, and the protection scope of the present disclosure shall still be subject to the scope defined in the attached claims.

The foregoing is only some embodiments of the present disclosure, and for the convenience and conciseness of the description, the replacement of other connection modes described above may refer to the corresponding process in the embodiment of the method described above, and will not be repeated herein. It should be understood that the protection scope of the present disclosure is not limited to this, and various equivalent modifications or substitutions within the scope of the technology disclosed in the present disclosure, and such modifications or substitutions shall be covered by the protection scope of the present disclosure.

What is claimed is:

1. A display panel, comprising:
a first substrate;
a second substrate arranged opposite to the first substrate;
an electrophoresis layer arranged between the first substrate and the second substrate, wherein the electrophoresis layer comprises a plurality of electrophoresis particles;
a liquid-blocking portion arranged at an edge of the first substrate and/or the second substrate; and
a supporting structure arranged between the first substrate and the second substrate, wherein the supporting structure comprises a first supporting portion and a second supporting portion, and a height of the first supporting portion is greater than a height of the second supporting portion in a direction perpendicular to a plane where the first substrate is located;
wherein a minimum distance between the second supporting portion and the liquid-blocking portion is less than a minimum distance between the first supporting portion and the liquid-blocking portion.

2. The display panel according to claim 1, wherein the first supporting portion comprises a plurality of first supporting bars arranged at intervals along a first direction, and the first direction is parallel to the plane where the first substrate is located.

3. The display panel according to claim 2, wherein at least one of the plurality of first supporting bars comprises a plurality of first supporting segments that are connected with each other, and extension directions of at least part of the plurality of first supporting segments are different.

4. The display panel according to claim 2, wherein extension directions of at least part of the plurality of first supporting bars are parallel to each other.

5. The display panel according to claim 2, wherein at least one of the plurality of first supporting bars extends along a second direction, the first supporting portion further comprises a second supporting bar arranged at intervals along the second direction and extending along the first direction, and the first direction intersects with the second direction.

6. The display panel according to claim 5, wherein the display panel comprises a plurality of pixels arranged in an array, and at least one of the first supporting portion and the second supporting portion is enclosed on a peripheral side of the plurality of pixels.

7. The display panel according to claim 6, wherein
a plurality of pixels arranged side by side along the second direction are arranged between adjacent first supporting bars; and/or,
a plurality of pixels arranged side by side along the first direction are arranged between adjacent second supporting bars.

8. The display panel according to claim 7, wherein
the second supporting portion comprises a third supporting bar extending along the first direction, and the third supporting bar is arranged between the adjacent first supporting bars to separate the plurality of pixels arranged side by side in the second direction; and/or,
the second supporting portion comprises a fourth supporting bar extending along the second direction, and the fourth supporting bar is arranged between the adjacent second supporting bars to separate the plurality of pixels arranged side by side in the first direction.

9. The display panel according to claim 1, wherein the first supporting portion comprises a plurality of first supporting columns arranged at intervals.

10. The display panel according to claim 1, wherein the display panel comprises a display area and a non-display area, the non-display area at least partially surrounds the display area, the liquid-blocking portion is arranged within the non-display area, and the first supporting portion and the second supporting portion are arranged within the display area.

11. The display panel according to claim 10, wherein
the display area comprises a first area and a second area, and a distance between a center of the first area and a center of the display area is less than a distance between a center of the second area and the center of the display area;
the first supporting portion comprises a first supporting sub-portion arranged in the first area and a second supporting sub-portion arranged in the second area;
a distribution density of the first supporting sub-portion is greater than a distribution density of the second supporting sub-portion; and/or, an orthographic projection area of the first supporting sub-portion on the first substrate per unit area is greater than an orthographic projection area of the second supporting sub-portion on the first substrate per unit area.

12. The display panel according to claim 1, wherein a height of the first supporting portion gradually decreases in a direction from a center of the display panel to an edge of the display panel.

13. The display panel according to claim 12, wherein
a length of the display panel in a third direction is a, a length of the display panel in a fourth direction is b, and the third direction is perpendicular to the fourth direction;
a height of the liquid-blocking portion is H0, a height of the first supporting portion at the center of the display panel is H1, and a height of the first supporting portion at a first position is H2; and
a following formula is satisfied:

$$\frac{(H1-H0)}{4}\cos\frac{\pi x}{a}\cos\frac{\pi y}{a}+H0 \le (H1-H0)\cos\frac{\pi x}{a}\cos\frac{\pi y}{a}+H0,$$

wherein x is a distance between the first position and the center of the display panel in the third direction, and y is a distance between the first position and the center of the display panel in the fourth direction.

14. The display panel according to claim 1, wherein the electrophoresis layer further comprises a supporting layer, the first supporting portion and the second supporting portion are connected to the supporting layer, and the supporting layer, the first supporting portion and the second supporting portion comprise a same material.

15. The display panel according to claim 1, wherein the first supporting portion is arranged on the first substrate, and the second supporting portion is arranged on the second substrate.

16. The display panel according to claim 15, wherein the first supporting portion is arranged at intervals with the second substrate.

17. The display panel according to claim 15, wherein
a cross-section size of the first supporting portion gradually decreases in a direction from the first substrate to the second substrate; and
a cross-section size of the second supporting portion gradually increases in the direction from the first substrate to the second substrate.

18. The display panel according to claim 1, wherein a height of the liquid-blocking portion is H0, and a height of the first supporting portion is h;

wherein a following formula is satisfied:

$$0.8 \leq h \leq 1.2H0.$$

19. The display panel according to claim 1, wherein the first supporting portion is provided with a flow channel, and in a direction parallel to the plane where the first substrate is located, the flow channel runs through the first supporting portion and is configured to allow the electrophoresis particles to pass through.

20. A display device, comprising a display panel, wherein the display panel comprises:

a first substrate;

a second substrate arranged opposite to the first substrate;

an electrophoresis layer arranged between the first substrate and the second substrate, wherein the electrophoresis layer comprises a plurality of electrophoresis particles;

a liquid-blocking portion arranged at an edge of the first substrate and/or the second substrate; and a supporting structure arranged between the first substrate and the second substrate, wherein the supporting structure comprises a first supporting portion and a second supporting portion, and a height of the first supporting portion is greater than a height of the second supporting portion in a direction perpendicular to a plane where the first substrate is located;

wherein a minimum distance between the second supporting portion and the liquid-blocking portion is less than a minimum distance between the first supporting portion and the liquid-blocking portion.

\* \* \* \* \*